US010685644B2

(12) United States Patent
Kirichenko et al.

(10) Patent No.: US 10,685,644 B2
(45) Date of Patent: Jun. 16, 2020

(54) METHOD AND SYSTEM FOR TEXT-TO-SPEECH SYNTHESIS

(71) Applicant: YANDEX EUROPE AG, Lucerne (CH)

(72) Inventors: Vladimir Vladimirovich Kirichenko, Moscow (RU); Petr Vladislavovich Luferenko, Redmond, WA (US)

(73) Assignee: YANDEX EUROPE AG, Lucerne (CH)

( * ) Notice: Subject to any disclaimer, the term of this patent is extended or adjusted under 35 U.S.C. 154(b) by 237 days.

(21) Appl. No.: 16/027,337

(22) Filed: Jul. 4, 2018

(65) Prior Publication Data

US 2019/0206386 A1 Jul. 4, 2019

(30) Foreign Application Priority Data

Dec. 29, 2017 (RU) .................................. 2017146887

(51) Int. Cl.
*G10L 13/04* (2013.01)
*G10L 13/08* (2013.01)
(Continued)

(52) U.S. Cl.
CPC .............. *G10L 13/08* (2013.01); *G06F 17/16* (2013.01); *G06F 40/205* (2020.01); *G06N 20/00* (2019.01);
(Continued)

(58) Field of Classification Search
CPC ..................................................... G10L 13/04
See application file for complete search history.

(56) References Cited

U.S. PATENT DOCUMENTS 3,575,555 A * 4/1971 Schanne ................ G10L 13/08
704/267
4,692,941 A * 9/1987 Jacks ...................... G10L 13/04
704/260
(Continued)

FOREIGN PATENT DOCUMENTS

EP 0508225 A2 10/1992
RU 2320026 C2 3/2008
(Continued)

OTHER PUBLICATIONS

Search Report with regard to the counterpart RU Patent Application No. 2017146887 completed Mar. 20, 2019.

*Primary Examiner* — Feng-Tzer Tzeng
(74) *Attorney, Agent, or Firm* — BCF LLP

(57) ABSTRACT

There is disclosed a method of generating a text-to-speech (TTS) training set for training a Machine Learning Algorithm (MLA) for generating machine-spoken utterances The method is executable by a server. The method includes generating a synthetic word based on merging separate phonemes from each of two words of a corpus of pre-recorded utterances, the merging being done using the common phoneme as a merging anchor, the merging resulting in at least two synthetic words. The synthetic words and assessor labels are used to train a classifier to predict a quality parameter associated with a new synthetic phonemes-based word, the quality parameter being representative of whether the new synthetic phonemes-based word is naturally sounding (based on acoustic features of generated synthetic words utterances). The classifier is then used to generate training objects for the MLA and to use the MLA to process the corpus of pre-recorded utterances into their respective vectors.

19 Claims, 6 Drawing Sheets

(51) Int. Cl.

| | | |
|---|---|---|
| *G10L 13/02* | (2013.01) | |
| *G06F 17/16* | (2006.01) | |
| *G10L 15/187* | (2013.01) | |
| *G10L 13/00* | (2006.01) | |
| *G10L 13/06* | (2013.01) | |
| *G06N 20/00* | (2019.01) | |
| *G06F 40/205* | (2020.01) | |

(52) U.S. Cl.
CPC .............. *G10L 13/00* (2013.01); *G10L 13/02* (2013.01); *G10L 13/06* (2013.01); *G10L 15/187* (2013.01); *G10L 13/04* (2013.01)

(56) References Cited

U.S. PATENT DOCUMENTS

| | | |
|---|---|---|
| 5,809,462 A | 9/1998 | Nussbaum |
| 6,308,156 B1 | 10/2001 | Barry et al. |
| 7,308,407 B2 | 12/2007 | Reich |
| 7,406,417 B1 | 7/2008 | Hain |
| 7,496,515 B2 | 2/2009 | Glinski et al. |
| 7,912,716 B2 | 3/2011 | McCuller |
| 7,966,177 B2 | 6/2011 | Geiger |
| 8,155,963 B2 * | 4/2012 | Aaron ..................... G10L 13/04 704/258 |
| 8,175,881 B2 | 5/2012 | Morinaka et al. |
| 8,554,555 B2 | 10/2013 | Gruhn et al. |
| 9,269,346 B2 | 2/2016 | Conkie et al. |
| 9,542,927 B2 * | 1/2017 | Agiomyrgiannakis ...................... G10L 13/02 |
| 2003/0088416 A1 | 5/2003 | Griniasty |
| 2006/0173685 A1 | 8/2006 | Huang |
| 2008/0195391 A1 | 8/2008 | Marple et al. |
| 2010/0082349 A1 | 4/2010 | Bellegarda et al. |
| 2012/0089402 A1 | 4/2012 | Latorre et al. |
| 2016/0372118 A1 | 12/2016 | Senior et al. |
| 2017/0092258 A1 | 3/2017 | Edrenkin |

FOREIGN PATENT DOCUMENTS

| | | |
|---|---|---|
| WO | 2005034083 A1 | 4/2005 |
| WO | 2017131924 A1 | 8/2017 |

* cited by examiner

METHOD AND SYSTEM FOR TEXT-TO-SPEECH SYNTHESIS

CROSS-REFERENCE

The present application claims priority from Russian Patent Application No. 2017146887, entitled "Method and System for Text-to-Speech Synthesis", filed Dec. 29, 2017, the entirety of which is incorporated herein by reference.

FIELD

The present technology relates to a method and system for text-to-speech synthesis. In particular, the present technology relates to methods and systems for training a Machine Learning Algorithm (MLA) to produce a machine-generated utterance of a text and a method for using the so-trained MLA to produce the machine-generated utterance.

BACKGROUND

In text-to-speech (TTS) systems, a portion of an inputted text (or a text file) is converted into audio speech (or an audio speech file). Such systems are used in a wide variety of applications such as electronic games, e-book readers, e-mail readers, satellite navigation, automated telephone systems, and automated warning systems. For example, some instant messaging (IM) systems use TTS synthesis to convert text chat to speech. This can be very useful for people who have difficulty reading, people who are driving, or people who simply do not want to take their eyes off whatever they are doing to change focus to the IM window.

Another recent area for application of the TTS systems are "personal assistants". These personal assistants are implemented as either software integrated into a device (such as SIRI™ assistant provided with APPLE™ devices) or stand-alone hardware devices with the associated software (such as AMAZON™ ECHO™ device). The personal assistants provide an utterance-based interface between the electronic device and the user. The user is able to issue commands by voice (for example, by saying "What is the weather today in New York, USA?").

The electronic device is configured to capture the utterance, convert the utterance to text and to process the user-generated command. In this example, the electronic device is configured to execute a search and determine the current weather forecast for New York. The electronic device is then configured to generate a machine-generated utterance representative of a response to the user query. In this example, the electronic device may be configured to generate a spoken utterance: "It is 5 degrees centigrade with the winds out of North-East".

One of the main challenges associated with the TTS systems is generation of the machine utterances that are "naturally sounding". In other words, the main challenge is making the machine generated utterance to sound as close as possible to the way a human would sound. Typically, the TTS systems employ Machine Learning Algorithms (MLAs) that are trained to generate the machine utterances for a given text that needs to be processed into a machine-generated utterance using a corpus of pre-recorded utterances.

These utterances are pre-recorded by a human (typically an actor with a good diction). The MLA is then configured to "cut and paste" various pieces of the corpus of pre-recorded utterances to generate the required machine utterance. Put another way, the MLA of the TTS system generates synthesized speech by "concatenating" pieces of recorded speech that are stored in a database.

For example, if the portion of the text to be process is "ma", the MLA picks the most appropriate piece of the pre-recorded utterances to generate the associated portion of the machine-generated utterance. One can easily appreciate that if a human were to pronounce the utterance "ma" it can sound differently depending on a plethora of reasons and circumstances—surrounding phonemes (i.e. the "context"), whether it is part of the stressed syllable or not, whether it is at a beginning of a word or at an end, etc. Thus, a given corpus of the pre-recorded utterances may have a number of utterances representing the text "ma" some of them sounding very different from the others of them and, thus, some of them being more (or less) suitable for generating a particular instance of the machine-generated utterance representing "ma".

Therefore, one of the challenges in this approach is to determine which pieces of the pre-recorded utterances to use for the given machine-generated utterance to make it as naturally sounding as possible. There are two parameters that are typically used to select a given piece for inclusion into the currently generated machine utterance—a target cost and a join (concatenation) cost.

Generally speaking, the target cost is indicative of whether a given piece of pre-recorded utterances is suitable for processing a given text portion. The join cost is indicative of how well two neighbouring pieces (of the potential selection of the neighbouring pieces) of the pre-recorded utterances will sound together (i.e. how naturally the transition between one of the pre-recorded utterance to the next neighbouring utterance sounds).

The target cost can be calculated using Formula 1:

$$C^t(t_i, u_i) = \sum_{j=1}^{p} \omega_j^t C_j^t(t_i, u_i) \qquad \text{Formula 1}$$

In other words, the target cost can be calculated as a weighted sum of differences in features of the text portion to be processed into the machine-generated utterance and the specific one of the pre-recorded utterances to be used to process such the text portion. The features that can be processed by the MLA for determining the target cost include: frequency of the main tone, duration, context, position of the element in the syllable, the number of the stress syllables in the phrase, etc.

The joint cost can be calculated using Formula 2:

$$C^c(u_{i-1}, u_i) = \sum_{j=1}^{q} \omega_j^c C_j^c(u_{i-1}, u_i) \qquad \text{Formula 2}$$

In other words, the joint cost is calculated as a weighted sum of features of two potentially neighbouring elements of the pre-recorded utterances.

The total cost can be calculated using Formula 3:

$$C(t_1^n, u_1^n) = \qquad \text{Formula 3}$$
$$\sum_{i=1}^{n} C^t(t_i, u_i) + \sum_{i=2}^{n} C^c(u_{i-1}, u_i) + C^c(S, u_1) + C^c(u_n, S)$$

-continued $$C(t_1^n, u_1^n) = \sum_{i=1}^{n} \sum_{j=1}^{p} \omega_j^t C_j^t(t_i, u_i) +$$

$$\sum_{i=2}^{n} \sum_{j=1}^{q} \omega_j^c C_j^c(u_{i-1}, u_i) + C^c(S, u_1) + C^c(u_n, S)$$

The total cost can be calculated using the totality of the target costs and the join cost associated with the given element of the pre-recorded utterances. Therefore, in order to process the text to be processed into the machine utterances, the server executing the MLA needs to select a set $U_1$, $U_2$, . . . , $U_N$ such that the total cost calculated according to Formula 3 is minimized.

U.S. Pat. No. 7,308,407 (published on Dec. 11, 2007 to IBM) discloses a method for generating synthetic speech can include identifying a recording of conversational speech and creating a transcription of the conversational speech. Using the transcription, rather than a predefined script, the recording can be analyzed and acoustic units extracted. Each acoustic unit can include a phoneme and/or a sub-phoneme. The acoustic units can be stored so that a concatenative text-to-speech engine can later splice the acoustic units together to produce synthetic speech.

U.S. Pat. No. 5,809,462 (published on Sep. 15, 1998 to Ericsson Messaging Systems Inc.) discloses an automated speech recognition system converts a speech signal into a compact, coded representation that correlates to a speech phoneme set. A number of different neural network pattern matching schemes may be used to perform the necessary speech coding. An integrated user interface guides a user unfamiliar with the details of speech recognition or neural networks to quickly develop and test a neural network for phoneme recognition. To train the neural network, digitized voice data containing known phonemes that the user wants the neural network to ultimately recognize are processed by the integrated user interface. The digitized speech is segmented into phonemes with each segment being labelled with a corresponding phoneme code. Based on a user selected transformation method and transformation parameters, each segment is transformed into a series of multiple dimension vectors representative of the speech characteristics of that segment. These vectors are iteratively presented to a neural network to train/adapt that neural network to consistently distinguish and recognize these vectors and assign an appropriate phoneme code to each vector. Simultaneous display of the digitized speech, segments, vector sets, and a representation of the trained neural network assist the user in visually confirming the acceptability of the phoneme training set. A user may also selectively audibly confirm the acceptability of the digitization scheme, the segments, and the transform vectors so that satisfactory training data are presented to the neural network. If the user finds a particular step or parameter produces an unacceptable result, the user may modify one or more of the parameters and verify whether the modification effected an improvement in performance. The trained neural network is also automatically tested by presenting a test speech signal to the integrated user interface and observing both audibly and visually automatic segmentation of the speech, transformation into multidimensional vectors, and the resulting neural network assigned phoneme codes. A method of decoding such phoneme codes using the neural network is also disclosed.

SUMMARY

It is thus an object of the present technology to ameliorate at least some of the inconveniences present in the prior art.

Embodiments of the present technology have been developed based on developers' appreciation of at least one problem associated with the prior art approaches to training and using the TTS systems. Without wishing to be bound to any specific theory, developers have appreciated two problems with the prior art approaches. First, generating the training objects for the MLA can be resource consuming, both in terms of the number of human assessors required and the cost associated therewith. Second, since the generation of machine utterances is typically done in "real time" (as the interaction between the user and the electronic device is done on the fly and there is a requirement to generate the machine utterances without a significant user-appreciateable delay), the cost function needs to be calculated fast.

As such, the TTS system employing the MLA implemented in accordance with the non-limiting embodiments of the present technology generates (or has access to) a corpus of pre-recorded utterances (and the associated textual representation thereof). The corpus of pre-recorded utterances is typically generated by an actor reading a text, which is recorded and then processed into the textual representation thereof.

The TTS system then parses the textual representation of each word of the word-corpus into at least one phoneme. The TTS system then, for each selected two so-parsed words, the two words having a common phoneme in-between them: generates a synthetic word based on merging separate phonemes from each of the two words, the merging being done using the common phoneme as a merging anchor, the merging resulting in at least two synthetic words. In some embodiments of the present technology, the merging is done across a single merging anchor.

The so-generated synthetic words are then processed into synthetic words utterances, which synthetic words utterances are presented to human assessors. The assessors are asked to assign a label to the given synthetic word utterance, the label representative of whether or not the synthetic words utterance is naturally sounding or not. In some embodiments of the present technology, the human assessor are asked not to judge the synthetic words utterances are meaningful or not—just whether is it naturally sounding or not. The so assigned label can be binary—such as "good" or "bad". In yet other alternative non-limiting embodiments the assigned label can be selected on a sliding scale from zero to one (zero being non-naturally sounding and one being naturally sounding).

The TTS system then trains a classifier to predict a score for generated synthetic words utterances, the scores being representative of human-appreciation parameter of a phoneme transition pattern between phonemes across the anchor, the human-appreciation parameter being indicative of the transition pattern being naturally sounding. In other words, the classifier is trained to predict the label that would have been assigned to the synthetic word by the human assessor.

The classifier is trained to use acoustic features. The acoustic features can include at least one of a fundamental frequency and mel-frequency cepstrum (MFC). In some embodiments of the present technology, the classifier uses the features of the given phoneme and surrounding phonemes. In some embodiments of the present technology, the classifier uses an average value of acoustic features that is averaged for the given phoneme. In some embodiments of the present technology, classifier is implemented a Gradient Boosting Tree based model. However, other models can also be used.

Once the classifier is trained, the classifier is used to generate the training objects for the MLA. In some embodiments, the MLA is implemented as a Deep Structured Semantic Model (DSSM) based MLA. The DSSM based MLA can have two sub-networks, and the training the MLA comprises: feeding a first sub-network: a plurality of left sides of the new synthetic phonemes-based word and associated quality parameters; feeding a second sub-network a plurality of right sides of the new synthetic phonemes-based word and associated quality parameters; training the DSSM based MLA to generate vectors such that vectors of a given left side and a given right side that are associated with a comparatively higher associated quality parameter are also associated with a comparatively higher scalar multiplication value.

In some embodiments of the present technology, the DSSM based MLA generates vectors by using an embedding algorithm is used to translate acoustic features into a representation of a pre-determined length (size) K (the representation being made for both the "left" size and the "right" size of the anchor).

As such, when during the in-use phase, the DSSM based MLA needs to calculate the join cost for the entirety of candidates (of the left side having a number M and the right side candidates having a number N), the DSSM based MLA multiplies two matrices of size M×K and K×N, which allows to reduce the time required for calculating the total cost.

In accordance with a first broad aspect of the present technology, there is provided a method of generating a text-to-speech (TTS) training set for training a Machine Learning Algorithm (MLA) for generating machine-spoken utterances representing an inputted text. The method is executable by a server. The method comprises: receiving a word-corpus, each word of the word-corpus having: a textual representation; a spoken representation; parsing the textual representation of each word of the word-corpus into at least one phoneme; for each selected two words, the two words having a common phoneme in-between them: generating a synthetic word based on merging separate phonemes from each of the two words, the merging being done using the common phoneme as a merging anchor, the merging resulting in at least two synthetic words; generating synthetic words utterances based on the generated at least two synthetic words; receiving scores for the generated synthetic words utterances, the scores being representative of human-appreciation parameter of a phoneme transition pattern between phonemes across the anchor, the human-appreciation parameter being indicative of the transition pattern being naturally sounding; determining acoustic features of generated synthetic words utterances; and training a classifier based on the generated synthetic words utterances, the acoustic features and the scores to generate: a quality parameter associated with a new synthetic phonemes-based word, the quality parameter being representative of whether the new synthetic phonemes-based word is naturally sounding.

In some implementations of the method, the method further comprises: generating the TTS training set for training the MLA, the TTS training set including a plurality of training objects, each of the plurality of training objects including: a respective new synthetic phonemes-based word; an associated quality parameter generated by the classifier.

In some implementations of the method, the MLA is a Deep Structured Semantic Model (DSSM) based MLA.

In some implementations of the method, the DSSM based MLA has two sub-networks, and wherein training the MLA comprises: feeding a first sub-network: a plurality of left sides of the new synthetic phonemes-based word and associated quality parameters; feeding a second sub-network a plurality of right sides of the new synthetic phonemes-based word and associated quality parameters; training the DSSM based MLA to generate vectors such that vectors of a given left side and a given right side that are associated with a comparatively higher associated quality parameter are also associated with a comparatively higher scalar multiplication value.

In some implementations of the method, each of the new synthetic phonemes-based word is processed as a potential left side and a potential right side.

In some implementations of the method, the training the DSSM based MLA to generate vectors further comprises training the DSSM based MLA such that vectors of another given left side and another given right side that are associated with a comparatively lower associated quality parameter are also associated with a comparatively lower scalar multiplication value.

In some implementations of the method, the method further comprises: processing an entirety of phonemes of the word-corpus through the first sub-network and the second sub-network to generate a respective left-side vector and the right-side vector of each of the entirety of phonemes; storing a plurality of generated left-side vectors and right-side vectors in a memory storage.

In some implementations of the method, the processing the entirety of phonemes comprises executing an embedding algorithm to generate a vector based on the phoneme.

In some implementations of the method, the plurality of generated left-side vectors and right-side vectors is used during an in-use-phase to generate a cost function of the machine-spoken utterances during processing the inputted text.

In some implementations of the method, the method further comprises, during the in-use-phase, calculating the cost function by multiplication a first matrix by a second matrix, the first matrix comprising the left-side vectors and the second matrix comprising the right-side vectors.

In some implementations of the method, the acoustic features comprises at least one of a fundamental frequency and mel-frequency cepstrum (MFC).

In some implementations of the method, a given acoustic feature of a given phoneme is generated based on the given phoneme and its context.

In some implementations of the method, the context of the given phoneme is at least one adjacent other phoneme.

In some implementations of the method, the classifier is implemented as a decision tree based MLA.

In some implementations of the method, the synthetic word has only a single merging anchor.

In accordance with another broad aspect of the present technology, there is provided a computing device for generating a text-to-speech (TTS) training set for training a Machine Learning Algorithm (MLA) for generating machine-spoken utterances representing an inputted text, the MLA executed by the computing device. The computing device including a processor, the processor configured to: receive a word-corpus, each word of the word-corpus having: a textual representation; a spoken representation; parse the textual representation of each word of the word-corpus into at least one phoneme; for each selected two words, the two words having a common phoneme in-between them: generate a synthetic word based on merging separate phonemes from each of the two words, the merging being done using the common phoneme as a merging anchor, the merging resulting in at least two synthetic words; generate synthetic words utterances based on the generated at least two synthetic words; receive scores for the generated synthetic words utterances, the scores being representative of human-appreciation parameter of a phoneme transition pattern between phonemes across the anchor, the human-appreciation parameter being indicative of the transition pattern being naturally sounding; determine acoustic features of generated synthetic words utterances; and train a classifier based on the generated synthetic words utterances, the acoustic features and the scores to generate: a quality parameter associated with a new synthetic phonemes-based word, the quality parameter being representative of whether the new synthetic phonemes-based word is naturally sounding.

In some implementations of the computing device, the computing device is a server. In other implementations of the computing device, the computing device can be a user electronic device.

In the context of the present specification, unless specifically provided otherwise, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, unless specifically provided otherwise, a "client device" is an electronic device associated with a user and includes any computer hardware that is capable of running software appropriate to the relevant task at hand. Thus, some (non-limiting) examples of client devices include personal computers (desktops, laptops, netbooks, etc.), smartphones, and tablets, as well as network equipment such as routers, switches, and gateways. It should be noted that a computing device acting as a client device in the present context is not precluded from acting as a server to other client devices. The use of the expression "a client device" does not preclude multiple client devices being used in receiving/sending, carrying out or causing to be carried out any task or request, or the consequences of any task or request, or steps of any method described herein.

In the context of the present specification, unless specifically provided otherwise, a "computing device" is any electronic device capable of running software appropriate to the relevant task at hand. A computing device may be a server, a client device, etc.

In the context of the present specification, unless specifically provided otherwise, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless specifically provided otherwise, the expression "information" includes information of any nature or kind whatsoever, comprising information capable of being stored in a database. Thus information includes, but is not limited to audio-visual works (photos, movies, sound records, presentations etc.), data (map data, location data, numerical data, etc.), text (opinions, comments, questions, messages, etc.), documents, spreadsheets, etc.

In the context of the present specification, unless specifically provided otherwise, the expression "component" is meant to include software (appropriate to a particular hardware context) that is both necessary and sufficient to achieve the specific function(s) being referenced.

In the context of the present specification, unless specifically provided otherwise, the expression "information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless specifically provided otherwise, the expression "text" is meant to refer to a human-readable sequence of characters and the words they form. A text can generally be encoded into computer-readable formats such as ASCII. A text is generally distinguished from non-character encoded data, such as graphic images in the form of bitmaps and program code. A text may have many different forms, for example it may be a written or printed work such as a book or a document, an email message, a text message (e.g., sent using an instant messaging system), etc.

In the context of the present specification, unless specifically provided otherwise, the expression "acoustic" is meant to refer to sound energy in the form of waves having a frequency, the frequency generally being in the human hearing range. "Audio" refers to sound within the acoustic range available to humans. "Speech" and "synthetic speech" are generally used herein to refer to audio or acoustic, e.g., spoken, representations of text. Acoustic and audio data may have many different forms, for example they may be a recording, a song, etc. Acoustic and audio data may be stored in a file, such as an MP3 file, which file may be compressed for storage or for faster transmission.

In the context of the present specification, unless specifically provided otherwise, the expression "neural network" is meant to refer to a system of programs and data structures designed to approximate the operation of the human brain. Neural networks generally comprise a series of algorithms that can identify underlying relationships and connections in a set of data using a process that mimics the way the human brain operates. The organization and weights of the connections in the set of data generally determine the output. A neural network is thus generally exposed to all input data or parameters at once, in their entirety, and is therefore capable of modeling their interdependencies. In contrast to machine learning algorithms that use decision trees and are therefore constrained by their limitations, neural networks are unconstrained and therefore suited for modelling interdependencies.

In the context of the present specification, unless specifically provided otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
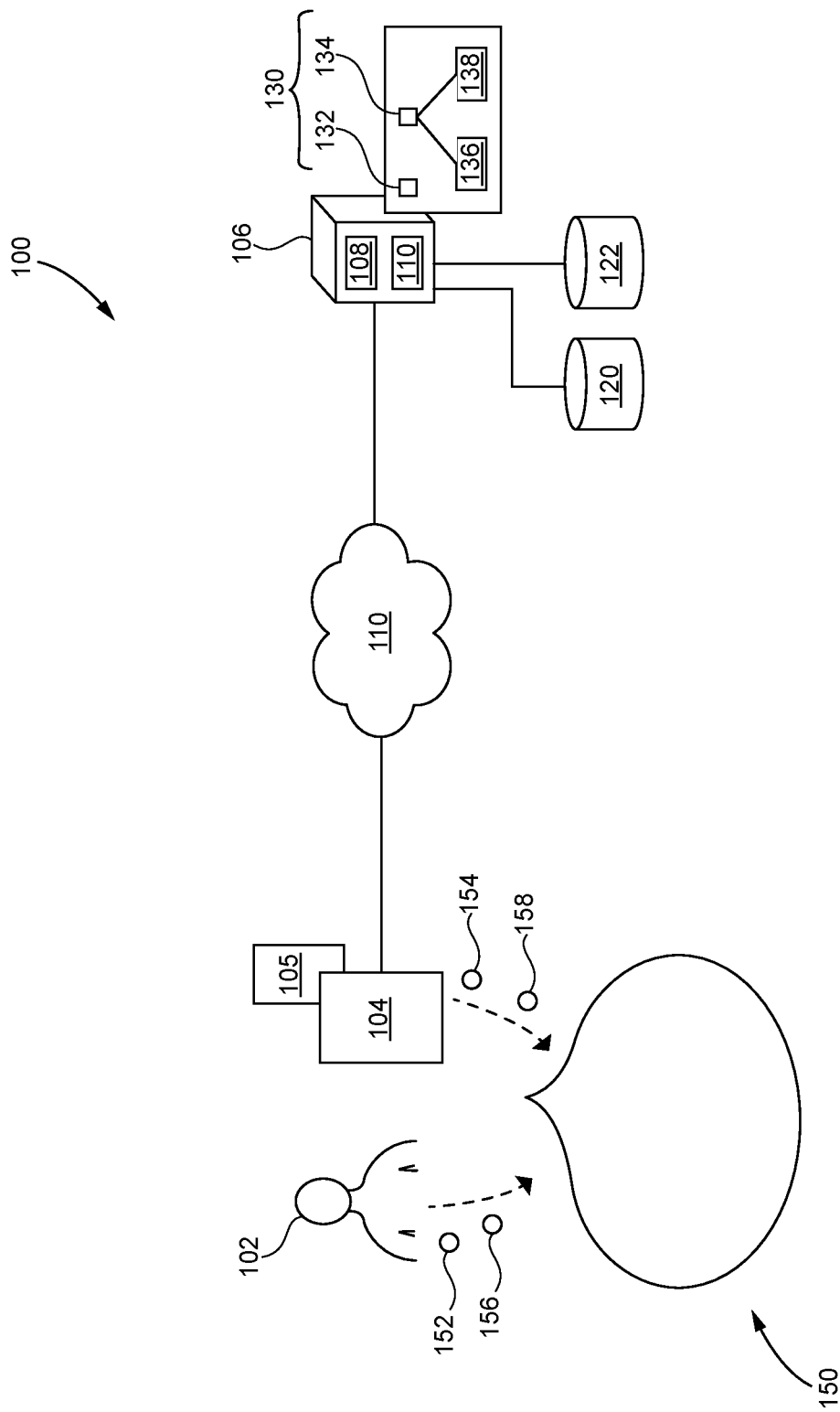
FIG. 1 is a schematic diagram of a system implemented in accordance with a non-limiting embodiment of the present technology.

Referring to FIG. 1, there is depicted a schematic diagram of a system 100, the system 100 being suitable for implementing non-limiting embodiments of the present technology. It is to be expressly understood that the system 100 as depicted is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 100 may also be set forth below. This is done merely as an aid to understanding, and, again, not to define the scope or set forth the bounds of the present technology.

These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances simple implementations of the present technology, and that where such is the case they have been presented in this manner as an aid to understanding. As persons skilled in the art would understand, various implementations of the present technology may be of a greater complexity.

Generally speaking, the system 100 is configured to generate machine-generated utterances of a text to be processed. The example implementation of the system 100 is directed to an environment where interaction between the user and the electronic device is implemented via an utterance-based interface. It should be noted however that embodiments of the present technology are not so limited. As such, methods and routines described herein can be implemented in any variation of the system 100 where it is desirable to generate a machine utterance.

Within the illustration of FIG. 1, the system 100 provide machine-generated responses to user queries, which can be said to result in a "conversation" between a given user and a given electronic device. For example, sound indications 152 and 156 (such as spoken utterances) from a user 102 may be detected by an electronic device 104 (or simply a "device 104"), which, in response, is configured to provide sound indications 154 and 158 (such as spoken utterances or "machine-generated utterances"). As such, it can be said that this results in a conversation 150 between the user 102 and the device 104, where the conversation 150 is composed of (i) the sound indications 152 and 156 and (ii) the sound indications 154 and 158.

Various components of the system 100 and how these components may be configured for implementing the provision of the sound indications 154 and 158 will now be described.

User Device

As previously mentioned, the system 100 comprises the device 104. The implementation of the device 104 is not particularly limited, but as an example, the device 104 may be implemented as a personal computer (desktops, laptops, netbooks, etc.), a wireless communication device (such as a smartphone, a cell phone, a tablet, a smart speaker and the like), as well as network equipment (such as routers, switches, and gateways). As such, the device 104 can sometimes be referred to as an "electronic device", "end user device", "client electronic device" or simply "device". It should be noted that the fact that the device 104 is associated with the user 102 does not need to suggest or imply any mode of operation—such as a need to log in, a need to be registered, or the like.

It is contemplated that the device 104 comprises hardware and/or software and/or firmware (or a combination thereof), as is known in the art, in order to (i) detect or capture the sound indications 152 and 156 and (ii) to provide or reproduce the sound indications 154 and 158. For example, the device 104 may comprise one or more microphones for detecting or capturing the sound indications 152 and 156 and one or more speakers for providing or reproducing the sound indications 154 and 158.

The device 104 also comprises hardware and/or software and/or firmware (or a combination thereof), as is known in the art, in order to execute an intelligent personal assistant (IPA) application 105. Generally speaking, the purpose of the IPA application 105, also known as a "chatbot", is to (i) enable the user 102 to submit queries in a form of spoken utterances (e.g., the sound indications 152 and 156) and, in response, (ii) provide to the user 102 intent-specific responses in a form of spoken utterances (e.g., the sound indications 154 and 158). Submission of queries and provision of intent-specific responses may be executed by the IPA application 105 via a natural language user interface.

Generally speaking, the natural language user interface of the IPA application 105 may be any type of computer-human interface where linguistic phenomena such as verbs, phrases, clauses and the like act as user interface controls for extracting, selecting, modifying or otherwise generating data in the IPA application 105.

For example, when spoken utterances of the user 102 (e.g., the sound indications 152 and 156) are detected (i.e. captured) by the device 104, the IPA application 105 may employ its natural language user interface in order to analyze the spoken utterances of the user 102 and extract data therefrom which is indicative of queries of the user 102. Also, data indicative of intent-specific responses, which may be received by the device 104, is analyzed by the natural language user interface of the IPA application 105 in order to provide or reproduce spoken utterances (e.g., the sound indications 154 and 158) indicative of the intent-specific responses.

Communication Network

In the illustrative example of the system 100, the device 104 is communicatively coupled to a communication network 110 for accessing and transmitting data packets to/from a server 106 and/or other web resources (not depicted). In some non-limiting embodiments of the present technology, the communication network 110 can be implemented as the Internet. In other non-limiting embodiments of the present technology, the communication network 110 can be implemented differently, such as any wide-area communication network, local-area communication network, a private communication network and the like. How a communication link (not separately numbered) between the device 104 and the communication network 110 is implemented will depend inter alia on how the device 104 is implemented.

Merely as an example and not as a limitation, in those embodiments of the present technology where the device 104 is implemented as a wireless communication device (such as a smartphone), the communication link can be implemented as a wireless communication link (such as but not limited to, a 3G communication network link, a 4G communication network link, Wireless Fidelity, or WiFi® for short, Bluetooth® and the like). In those examples where the device 104 is implemented as a notebook computer, the communication link can be either wireless (such as Wireless Fidelity, or WiFi® for short, Bluetooth® or the like) or wired (such as an Ethernet based connection).

Server

As previously mentioned, the system 100 also comprises the server 106 that can be implemented as a conventional computer server. In an example of an embodiment of the present technology, the server 106 can be implemented as a Dell™ PowerEdge™ Server running the Microsoft™ Windows Server™ operating system. Needless to say, the server 106 can be implemented in any other suitable hardware, software, and/or firmware, or a combination thereof. In the depicted non-limiting embodiments of the present technology, the server 106 is a single server. In alternative non-limiting embodiments of the present technology, the functionality of the server 106 may be distributed and may be implemented via multiple servers.

Generally speaking, the server 106 is configured to (i) receive data indicative of queries from the device 104, (ii) analyze the data indicative of queries and, in response, (iii) generate data indicative of machine-generated responses and (iv) transmit the data indicative of machine-generated responses to the device 104. To that end, the server 106 hosts an IPA service 108 associated with the IPA application 105.

The IPA service 108 comprises various components that may allow implementing the above-mentioned functionalities thereof. For example, the IPA service 108 may implement, inter alia, a plurality of machine learning algorithms (MLAs) 130 comprising a first MLA 132 and a second MLA 134. Generally speaking, a given MLA of the plurality of MLAs 130 (such as the first MLA 132 or the second MLA 134) is a computer-based algorithm that can "learn" from training data and make predictions based on in-use data. A given MLA is usually trained, during a training phase thereof, based on the training data to, in a sense, "learn" associations and/or patterns in the training data for making predictions, during an in-use phase thereof, based on the in-use data.

In accordance with the non-limiting embodiments of the present technology, the first MLA 132 can be implemented as a classifier. The first MLA 132 can be implemented using Gradient Boosting Tree based model. However, other models can also be used to implement the first MLA 132.

The second MLA 134 can be implemented using a Neural Network (NN) based MLA. In a non-limiting embodiment of the present technology, the second MLA 134 can be implemented as a Deep Structured Semantic Model (DSSM) based MLA. These are also referred to sometimes, by those of skill in the art, as a Deep Semantic Similarity Model.

It should be noted that the second MLA 134 can be implemented using other models as well. In the illustrated embodiment, the second MLA 134 has two sub-networks—a first sub-network 136 and a second sub-network 138.

The server 106 is further configured to execute a training routine 112. Generally speaking, the purpose of the training routine 112 is to train the plurality of MLAs 130.

In accordance with the non-limiting embodiments of the present technology, the training routine 112 is configured to have access to a corpus of pre-recorded utterances (and the associated textual representation thereof), as will be described herein below. The corpus of pre-recorded utterances is typically generated by an actor reading a text, which is recorded and then processed into the textual representation thereof.

The training routine 112 is configured to parse the textual representation of each word of the word-corpus into at least one phoneme. The parsing can be executed using known parsing techniques.

The training routine 112 then, for each selected two words, the two words having a common phoneme in-between them: generates a synthetic word based on merging separate phonemes from each of the two words, the merging being done using the common phoneme as a merging anchor, the merging resulting in at least two synthetic words. In some embodiments of the present technology, the merging is done across a single merging anchor.

Figure 4:
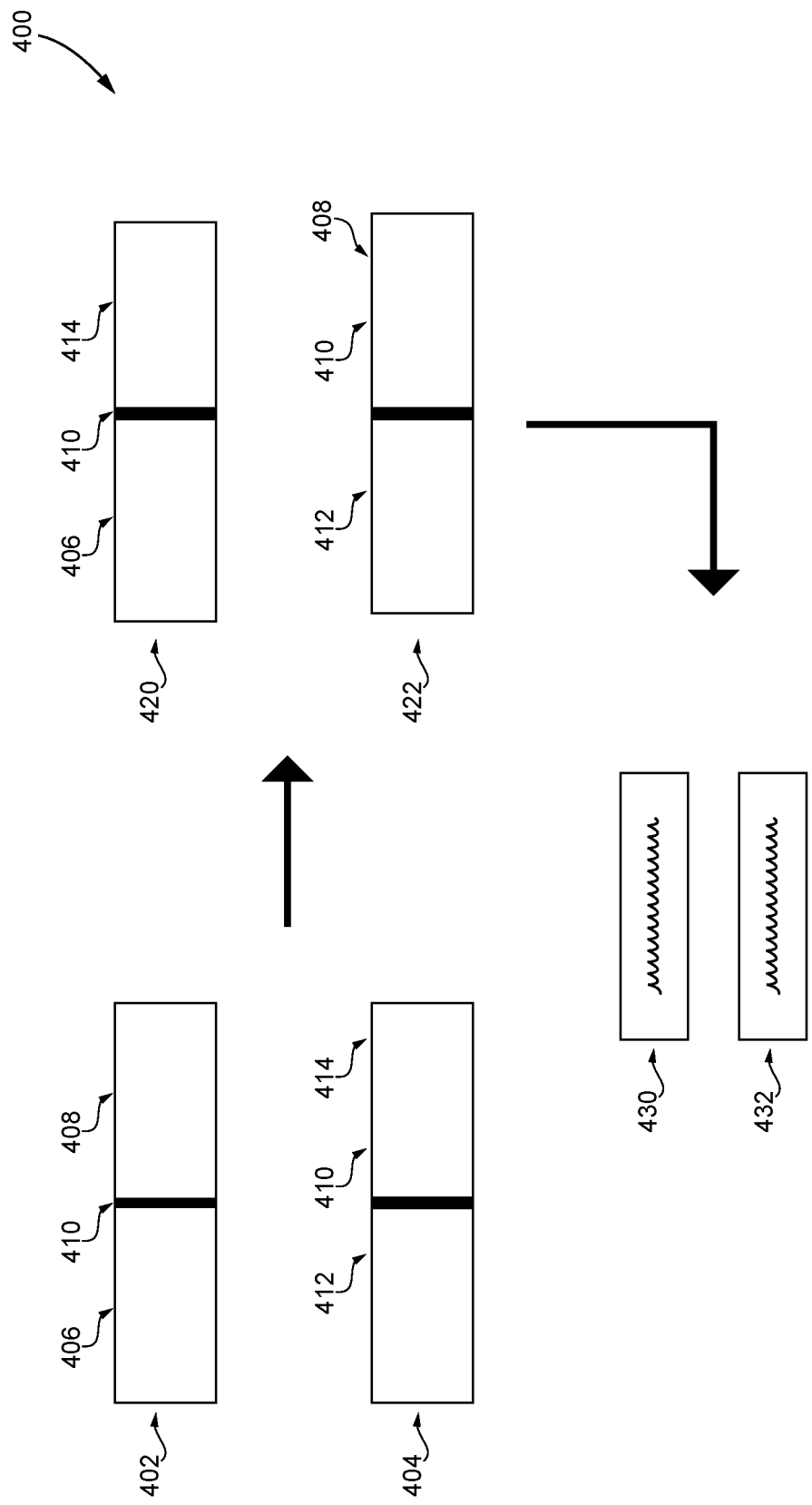
FIG. 4 depicts a schematic representation of a synthetic word generation routine implemented in the system of FIG. 1.

With reference to FIG. 4, there is depicted a schematic representation of a synthetic word generation routine 400. In the depicted illustration there are two words—a first word 402 and a second word 404, each having a common phoneme 410. It is noted that the first word 402 and the second word 404 can be words, phrases or sentences.

The first word 402 can be said to be split into two phonemes by the common phoneme 410—a first word first phoneme 406 and a first word second phoneme 408. By the same token, the second word 404 can be said to be split into two phonemes by the common phoneme 410—a second word first phoneme 412 and a second word second phoneme 414.

The training routine 112 generates two synthetic words—a first synthetic word 420 and a second synthetic word 422. The first synthetic word 420—is made up of two merged phonemes—the first word first phoneme 406 and the second word second phoneme 414, merged by the common phoneme 410 (which is used as a merging anchor). The second synthetic word 422 is made up of two other merged phonemes—second word first phoneme 412 and the first word second phoneme 408, merged by the common phoneme 410 (which is used as a merging anchor).

It is noted that each of the synthetic words is generated using a single merging anchor (i.e. the common phoneme 410). It is also noted that the first word 402 and the second word 404 do not have to be of the same length or have any similarity in semantic meaning. The key is that the first word 402 and the second word 404 share the common phoneme 410.

The training routine 112 repeats the merging process using a plurality of pairs of words, each part of the plurality of pairs of words selected such that they share a given common shared phoneme. In some embodiments of the present technology, each part of the plurality of pairs of words selected such that they share a single given common shared phoneme, which single given common shared phoneme is used as single merging anchor.

The so-generated synthetic words (such as the first synthetic word 420, the second synthetic word 422, as well other generated synthetic words) are then processed into synthetic words utterances (for example by merging the associated pieces of the corpus of pre-recorded utterances), depicted in FIG. 4 as a first synthetic word utterance 430 and second synthetic word utterance 432. The synthetic words utterances (i.e. the first synthetic word utterance 430, the second synthetic word utterance 432 and other synthetic word utterances so generated) are presented to human assessors.

The assessors are asked to assign a label to the given synthetic word utterance (i.e. the first synthetic word utterance 430, the second synthetic word utterance 432 and other synthetic word utterances so generated), the label representative of whether or not the synthetic words utterance (i.e. the first synthetic word utterance 430, the second synthetic word utterance 432 and other synthetic word utterances so generated) is naturally sounding or not. In some embodiments of the present technology, the human assessor are asked not to judge the synthetic words utterances are meaningful or not—just whether is it naturally sounding or not. The so assigned label can be binary—such as "good" or "bad". In yet other alternative non-limiting the assigned label can be selected on a sliding scale from zero to one (zero being non-naturally sounding and one being naturally sounding).

The training routine 112 then trains the first MLA 132 to predict a score for generated synthetic words utterances, the scores being representative of human-appreciation parameter of a phoneme transition pattern between phonemes across the anchor, the human-appreciation parameter being indicative of the transition pattern being naturally sounding. In other words, the classifier is trained to predict the label that would have been assigned to the synthetic word by the human assessor.

The first MLA 132 is trained to use acoustic features. The acoustic features can include at least one of a fundamental frequency and mel-frequency cepstrum (MFC).

In some embodiments of the present technology, the first MLA 132 uses the features of the given phoneme and surrounding phonemes. In some embodiments of the present technology, the first MLA 132 uses an average value of acoustic features that is averaged for the given phoneme.

Once the first MLA 132 is trained, the first MLA 132 is used to generate training objects for the second MLA 134. More specifically, the training routine 112 generates a plurality of synthetic word utterances and feeds the plurality of synthetic word utterances to the first MLA 132. The first MLA 132 assigns, to each of the so-generated plurality of synthetic word utterances a score. The score is, in a sense, a prediction of a human-appreciation parameter of a phoneme transition pattern between phonemes across the anchor, the human-appreciation parameter being indicative of the transition pattern being naturally sounding. The plurality of so-scored plurality of synthetic word utterances is then used to train the second MLA.

Figure 5:
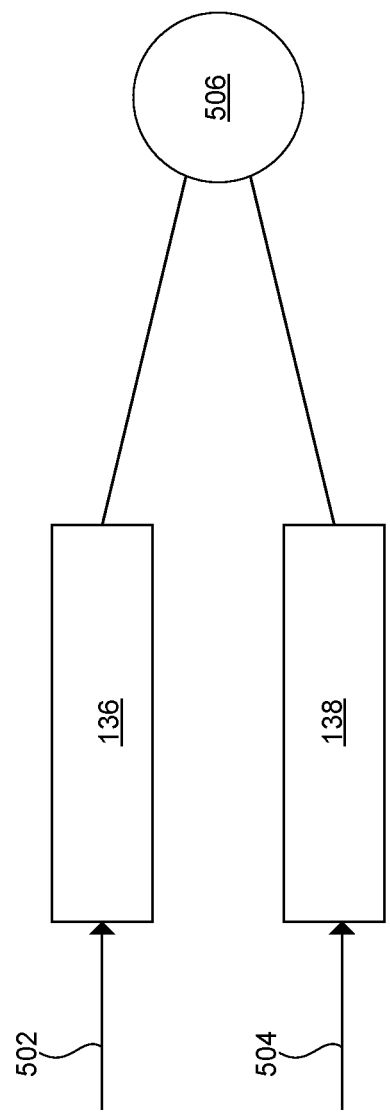
FIG. 5 depicts a process for training a second MLA executed by the system of FIG. 1.

With reference to FIG. 5, there is depicted a process for training the second MLA 134. More specifically, FIG. 5 depicts the first sub-network 136 and the second sub-network 138. The training routine 112 feeds a left side of utterances 502 to the first sub-network 136 and a right side of utterances 504 to the second sub-network 138. The plurality of pre-recorded utterances is parsed and used to generate the left side of utterances 502 and the right side of utterances 504. It is noted that each given left side (i.e. the first word first phoneme 406, and the second word first phoneme 412, etc.) and right side (i.e. the first word second phoneme 408, the second word second phoneme 414, etc.) of the scored plurality of synthetic word utterances is used for the left side of utterances 502 and the right side of utterances 504.

As an example and with reference to FIG. 4, the first word first phoneme 406, the second word second phoneme 414, the second word first phoneme 412 and the first word second phoneme 408 are all used to generate each one of the left side of utterances 502 and the right side of utterances 504.

Each of the first word first phoneme 406, the second word second phoneme 414, the second word first phoneme 412 and the first word second phoneme 408 are then translated, by a respective one of the first sub-network 136 and the second sub-network 138 into a vector of a pre-determine size K (for example, using embedding techniques and the like).

The second MLA 134 is trained to generate a resultant vector 506 of a given left side and the right side, the resultant vector 506 being a scalar multiplication of respective left side vector and the right side vector, such that the value of the resultant vector 506 is proportionate to the score values assigned by the first MLA 132 to the respective pair left side and the right side.

In other words, the higher the value of the assigned score to a given pair of left side and right side phonemes, the higher the value of the resultant vector 506.

The second MLA 134 is then used to generate a plurality of vectors for each possible left side and each possible right side, using the plurality of synthetic word utterances.

Returning to the description of FIG. 1, the server 106 is also communicatively coupled to a pre-recorded utterances database 120 and a assessor-scores database 122.

In the depicted illustration, the pre-recorded utterances database 120 and the assessor-scores database 122 are depicted as separate physical entities. This does not need to be so in each and every embodiment of the present technology. As such, the pre-recorded utterances database 120 and the assessor-scores database 122 may be implemented in a single database. Furthermore, any one of the pre-recorded utterances database 120 and the assessor-scores database 122 may, in itself, be split into several distributed storages.

Pre-Recorded Utterances Database 120

Generally speaking, the pre-recorded utterances database 120 is configured to store a corpus of pre-recorded utterances. These utterances are pre-recorded by a human (typically an actor with a good diction). As has been alluded to above and as will be described in greater detail herein below, the plurality of MLAs 130 is then configured to use the corpus of pre-recorded utterances to "cut and paste" various pieces of the pre-recorded corpus of utterances to generate the required machine-generated utterance.

Figure 2:
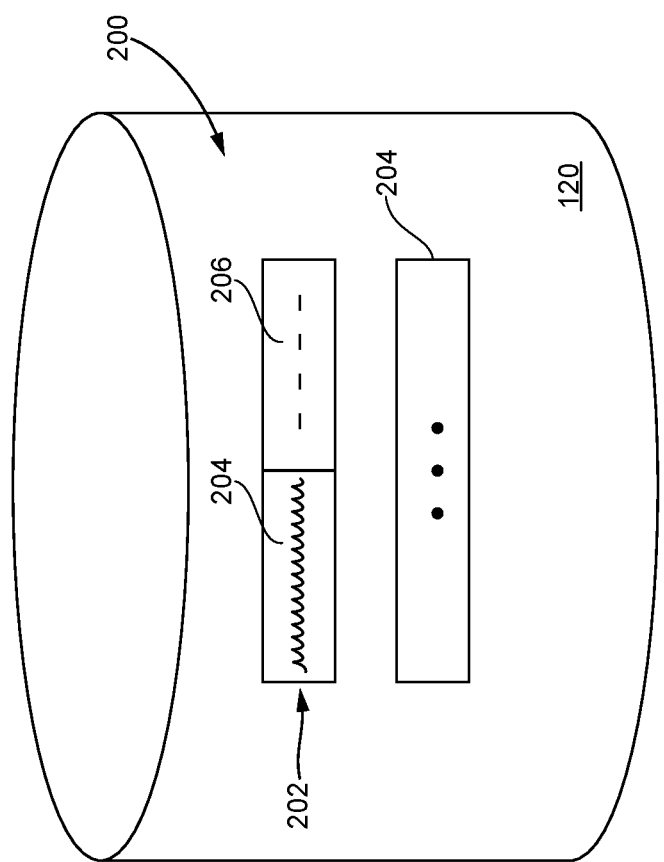
FIG. 2 depicts a schematic representation of the content of a pre-recorded utterances database of the system of FIG. 1.

With brief reference to FIG. 2, there is depicted a schematic representation of the content of the pre-recorded utterances database 120. The pre-recorded utterances database 120 stores a corpus of pre-recorded utterances 200. Each record 202 is associated with a given one of the pre-recorded utterances (i.e. each word or a group of words). Each record 202 maps a spoken representation 204 to a textual representation 206. It is noted that the textual representation 206 may have been generated using any appropriate speech to text conversion techniques.

The pre-recorded utterances database 120 contains a number of additional records 208 that are structured similar to the record 202.

Assessor-Scores Database 122

Figure 3:
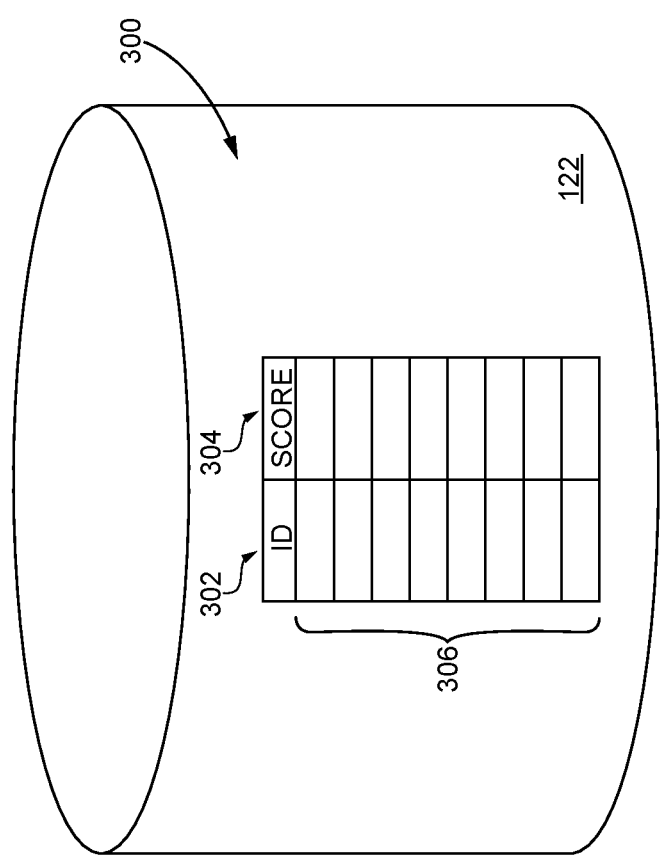
FIG. 3 depicts the content of an assessor-scores database of the system of FIG. 1.

With brief reference to FIG. 3, the content of the assessor-scores database 122 will now be described. The assessor-scores database 122 is used to store the above-mentioned assessor scores.

To recap, the synthetic words generated by the training routine 112 are processed into synthetic words utterances, which synthetic words utterances are presented to human assessors. The assessors are asked to assign a label to the given synthetic word utterance, the label representative of whether or not the synthetic words utterance is naturally sounding or not. In some embodiments of the present technology, the human assessor are asked not to judge the synthetic words utterances are meaningful or not—just whether is it naturally sounding or not. The so assigned label can be binary—such as "good" or "bad". In yet other alternative non-limiting the assigned label can be selected on a sliding scale from zero to one (zero being non-naturally sounding and one being naturally sounding).

Figure 6:
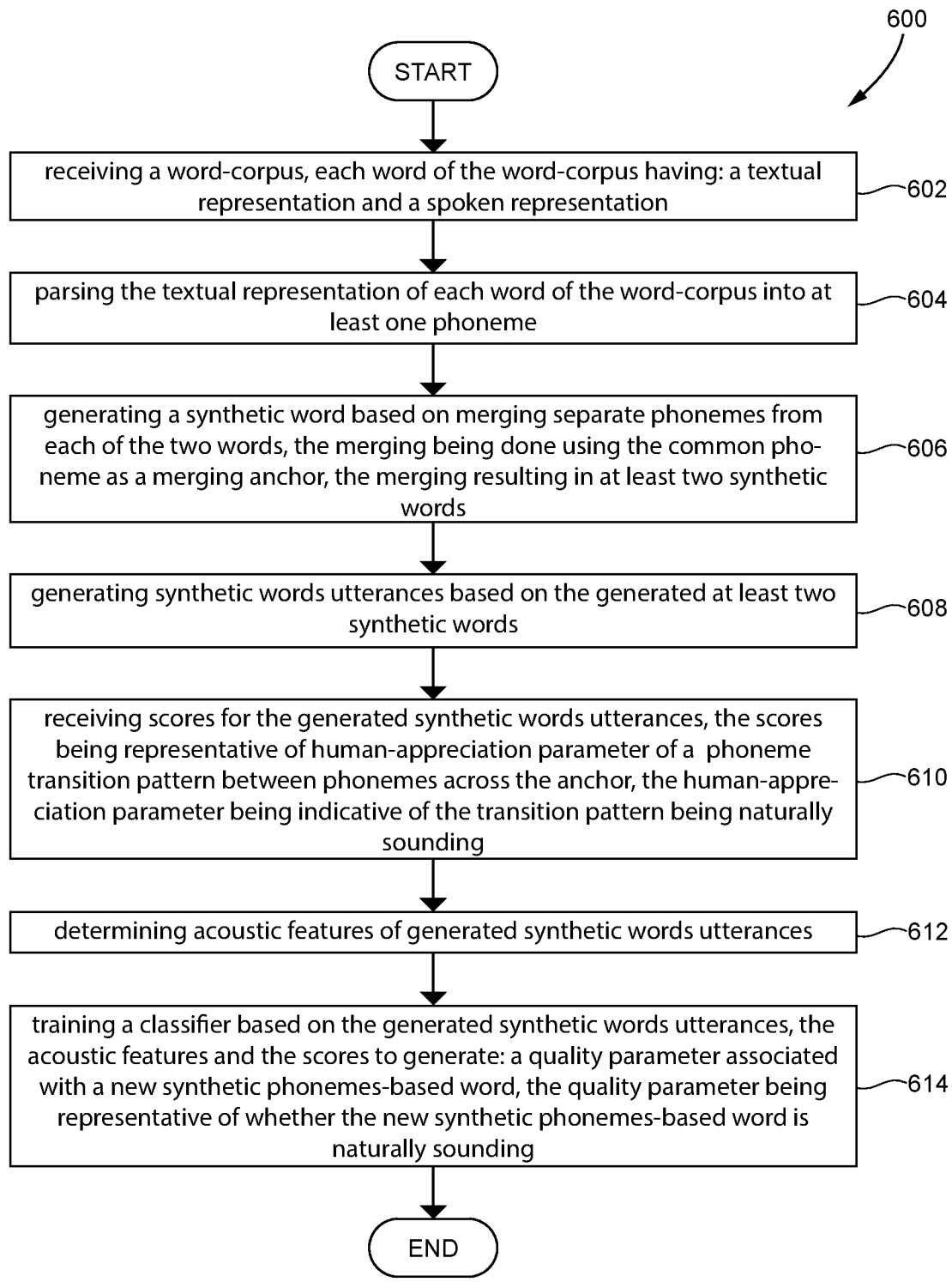
FIG. 6 depicts a block diagram of a flow chart of a method, the method executable in accordance with the non-limiting embodiments of the present technology in the system of FIG. 1.

Given the architecture described above it is possible to execute a method of generating a text-to-speech (TTS) training set for training a Machine Learning Algorithm (MLA) for generating machine-spoken utterances representing an inputted text. The method executed by the plurality of MLAs 130. With reference to FIG. 6, there is depicted a block diagram of a flow chart of a method 600, the method executable in accordance with the non-limiting embodiments of the present technology. The method 600 can be executed by the training routine 112 and/or by the plurality of MLAs 130 (or portions thereof).

Step 602—Receiving a Word-Corpus, Each Word of the Word-Corpus Having: A Textual Representation and a Spoken Representation The method 600 begins at step 602, where the training routine 112 and/or the plurality of MLAs 130 receive a word-corpus, each word of the word-corpus having: a textual representation and a spoken representation.

Step 604—Parsing the Textual Representation of Each Word of the Word-Corpus into at Least One Phoneme At step 604, the training routine 112 and/or the plurality of MLAs 130 parse the textual representation of each word of the word-corpus into at least one phoneme.

The next steps of the method 600 are executed for each selected two words, the two words having a common phoneme in-between them.

Step 606—Generating a Synthetic Word Based on Merging Separate Phonemes from Each of the Two Words, the Merging being Done Using the Common Phoneme as a Merging Anchor, the Merging Resulting in at Least Two Synthetic Words At step 606, the training routine 112 and/or the plurality of MLAs 130 generate a synthetic word based on merging separate phonemes from each of the two words, the merging being done using the common phoneme as a merging anchor, the merging resulting in at least two synthetic words.

Step 608—Generating Synthetic Words Utterances Based on the Generated at Least Two Synthetic Words At step 608, the training routine 112 and/or the plurality of MLAs 130 generate synthetic words utterances based on the generated at least two synthetic words.

Step 610—Receiving Scores for the Generated Synthetic Words Utterances, the Scores being Representative of Human-Appreciation Parameter of a Phoneme Transition Pattern Between Phonemes Across the Anchor, the Human-Appreciation Parameter being Indicative of the Transition Pattern being Naturally Sounding At step 610, the training routine 112 and/or the plurality of MLAs 130 receive scores for the generated synthetic words utterances, the scores being representative of human-appreciation parameter of a phoneme transition pattern between phonemes across the anchor, the human-appreciation parameter being indicative of the transition pattern being naturally sounding.

Step 612—Determining Acoustic Features of Generated Synthetic Words Utterances At step 612, the training routine 112 and/or the plurality of MLAs 130 determine acoustic features of generated synthetic words utterances.

Step 614—Training a Classifier Based on the Generated Synthetic Words Utterances, the Acoustic Features and the Scores to Generate: A Quality Parameter Associated with a New Synthetic Phonemes-Based Word, the Quality Parameter being Representative of Whether the New Synthetic Phonemes-Based Word is Naturally Sounding At step 614, the training routine 112 and/or the plurality of MLAs train a classifier (i.e. the second MLA 134) based on the generated synthetic words utterances, the acoustic features and the scores to generate: a quality parameter associated with a new synthetic phonemes-based word, the quality parameter being representative of whether the new synthetic phonemes-based word is naturally sounding.

In some embodiments of the method 600, the method 600 further comprises: generating the TTS training set for training the MLA (i.e. the second MLA 134), the TTS training set including a plurality of training objects, each of the plurality of training objects including: a respective new synthetic phonemes-based word; an associated quality parameter generated by the classifier (i.e. the first MLA 132).

Recalling that the second MLA 134 can be implemented as a Deep Structured Semantic Model (DSSM) based MLA and that the second MLA 134 has two sub-networks (i.e. the first sub-network 136 and the second sub-network 138), the training of the second MLA 134 may include: feeding a first sub-network: a plurality of left sides of the new synthetic phonemes-based word and associated quality parameters; feeding a second sub-network a plurality of right sides of the new synthetic phonemes-based word and associated quality parameters; training the DSSM based MLA to generate vectors such that vectors of a given left side and a given right side that are associated with a comparatively higher associated quality parameter are also associated with a comparatively higher scalar multiplication value.

As has been described above, in some non-limiting embodiments of the method 600, each of the new synthetic phonemes-based word is processed as a potential left side and a potential right side.

From the description presented above, it should become apparent that training the DSSM based MLA to generate vectors further comprises training the DSSM based MLA such that vectors of another given left side and another given right side that are associated with a comparatively lower associated quality parameter are also associated with a comparatively lower scalar multiplication value.

Once the method 600 is executed to train the second MLA 134, the method 600 further comprises processing an entirety of phonemes of the word-corpus through the first sub-network and the second sub-network to generate a respective left-side vector and the right-side vector of each of the entirety of phonemes; storing a plurality of generated left-side vectors and right-side vectors in a memory storage.

In some embodiments of the method 600, the processing the entirety of phonemes comprises executing an embedding algorithm to generate a vector based on the phoneme.

The so-generated left-side vectors and right-side vectors are used during an in-use-phase to generate a cost function of the machine-spoken utterances during processing the inputted text. As such, during the in-use-phase, the method 600 further comprises calculating the cost function by multiplication a first matrix by a second matrix, the first matrix comprising the left-side vectors and the second matrix comprising the right-side vectors.

Some of the above steps and signal sending-receiving are well known in the art and, as such, have been omitted in certain portions of this description for the sake of simplicity. The signals can be sent/received using optical means (such as a fibre-optic connection), electronic means (such as using wired or wireless connection), and mechanical means (such as pressure-based, temperature based or any other suitable physical parameter based means).

Some technical effects of non-limiting embodiments of the present technology may include provision of a fast, efficient, versatile, and/or affordable method for text-to-speech synthesis. Embodiments of the present technology may enable provision of the TTS that provides a more "naturally sounding" machine-generated utterances, when compared to the prior art approaches. This can be due, at least partially, to a more efficient training process for the MLAs.

It should be expressly understood that not all technical effects mentioned herein need to be enjoyed in each and every embodiment of the present technology. For example, embodiments of the present technology may be implemented without the user enjoying some of these technical effects, while other embodiments may be implemented with the user enjoying other technical effects or none at all.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of generating a text-to-speech (TTS) training set for training a Machine Learning Algorithm (MLA) for generating machine-spoken utterances representing an inputted text, the method executable by a server, the method comprising:
receiving a word-corpus, each word of the word-corpus having:
a textual representation, and
a spoken representation;
parsing the textual representation of each word of the word-corpus into at least one phoneme;
for a given two words from the word-corpus, the two words having a common phoneme in-between them:
generating two synthetic words based on merging phonemes from each of the two words, the merging being done using the common phoneme as a merging anchor, the merging resulting in the two synthetic words, the merging including:
merging a first phoneme from a first word of the given two words, the first phoneme preceding the merging anchor with a second phoneme from a second word of the given two words, the second phoneme being after the merging anchor; and
merging a third phoneme from the first word of the given two words, the third phoneme being after the merging anchor with a fourth phoneme from the second word of the given two words, the fourth phoneme preceding the merging anchor,
generating synthetic words utterances based on the generated two synthetic words,
receiving, from at least one human assessor, scores for the synthetic words utterances, the scores being representative of a human-appreciation parameter of a phoneme transition pattern between phonemes across the anchor, the human-appreciation parameter being indicative of the transition pattern being naturally sounding, and
determining acoustic features of the synthetic words utterances; and
training a classifier based on the synthetic words utterances, the acoustic features and the scores representative of the human-appreciation parameter of the phoneme transition pattern to generate:
a quality parameter associated with a new synthetic phonemes-based word, the quality parameter being representative of whether the new synthetic phonemes-based word is naturally sounding.

2. The method of claim 1, the method further comprising:
generating the TTS training set for training the MLA, the TTS training set including a plurality of training objects, each of the plurality of training objects including:
a respective new synthetic phonemes-based word;
an associated quality parameter generated by the classifier.

3. The method of claim 2, wherein the MLA is a Deep Structured Semantic Model (DSSM) based MLA.

4. The method of claim 3, wherein the DSSM based MLA has two sub-networks, and wherein training the MLA comprises:
feeding a first sub-network: a plurality of left sides of the new synthetic phonemes-based word and associated quality parameters;
feeding a second sub-network a plurality of right sides of the new synthetic phonemes-based word and associated quality parameters;
training the DSSM based MLA to generate vectors such that vectors of a given left side and a given right side that are associated with a comparatively higher associated quality parameter are also associated with a comparatively higher scalar multiplication value.

5. The method of claim 4, wherein each of the new synthetic phonemes-based word is processed as a potential left side and a potential right side.

6. The method of claim 4, wherein the training the DSSM based MLA to generate vectors further comprises training the DSSM based MLA such that vectors of another given left side and another given right side that are associated with a comparatively lower associated quality parameter are also associated with a comparatively lower scalar multiplication value.

7. The method of claim 6, the method further comprising:
processing an entirety of phonemes of the word-corpus through the first sub-network and the second sub-network to generate a respective left-side vector and the right-side vector of each of the entirety of phonemes;
storing a plurality of generated left-side vectors and right-side vectors in a memory storage.

8. The method of claim 7, wherein processing the entirety of phonemes comprises executing an embedding algorithm to generate a vector based on the phoneme.

9. The method of claim 7, wherein the plurality of generated left-side vectors and right-side vectors is used during an in-use-phase to generate a cost function of the machine-spoken utterances during processing the inputted text.

10. The method of claim 9, wherein the method further comprises, during the in-use-phase, calculating the cost function by multiplication a first matrix by a second matrix, the first matrix comprising the left-side vectors and the second matrix comprising the right-side vectors.

11. The method of claim 1, wherein the acoustic features comprises at least one of a fundamental frequency and mel-frequency cepstrum (MFC).

12. The method of claim 11, wherein a given acoustic feature of a given phoneme is generated based on the given phoneme and its context.

13. The method of claim 12, wherein the context of the given phoneme is at least one adjacent other phoneme.

14. The method of claim 1, wherein the classifier is implemented as a decision tree based MLA.

15. The method of claim 1, wherein each of the two synthetic words has only a single merging anchor.

16. A computing device for generating a text-to-speech (TTS) training set for training a Machine Learning Algorithm (MLA) for generating machine-spoken utterances representing an inputted text, the MLA executed by the computing device, the computing device including a processor, the processor configured to:
receive a word-corpus, each word of the word-corpus having:
a textual representation, and
a spoken representation;
parse the textual representation of each word of the word-corpus into at least one phoneme;
for a given two words from the word-corpus, the two words having a common phoneme in-between them:
generate two synthetic words based on merging phonemes from each of the two words, the merging being done using the common phoneme as a merging anchor, the merging resulting in the two synthetic words, the merging including:
merging a first phoneme from a first word of the given two words, the first phoneme preceding the merging anchor with a second phoneme from a second word of the given two words, the second phoneme being after the merging anchor; and
merging a third phoneme from the first word of the given two words, the third phoneme being after the merging anchor with a fourth phoneme from the second word of the given two words, the fourth phoneme preceding the merging anchor,
generate synthetic words utterances based on the generated at least two synthetic words,
receive, from at least one human assessor, scores for the synthetic words utterances, the scores being representative of a human-appreciation parameter of a phoneme transition pattern between phonemes across the anchor, the human-appreciation parameter being indicative of the transition pattern being naturally sounding, and
determine acoustic features of the synthetic words utterances; and
train a classifier based on the synthetic words utterances, the acoustic features and the scores representative of the human-appreciation parameter of the phoneme transition pattern to generate:
a quality parameter associated with a new synthetic phonemes-based word, the quality parameter being representative of whether the new synthetic phonemes-based word is naturally sounding.

17. The method of claim 1, wherein merging the first phoneme with the second phoneme comprises concatenating the first phoneme, the common phoneme, and the second phoneme, and wherein merging the third phoneme with the fourth phoneme comprises concatenating the third phoneme, the common phoneme, and the fourth phoneme.

18. The method of claim 1, wherein generating the synthetic word utterances based on the generated two synthetic words comprises:
concatenating a first utterance corresponding to the first phoneme, a second utterance corresponding to the common phoneme, and a third utterance corresponding to the second phoneme; and
concatenating a fourth utterance corresponding to the third phoneme, the second utterance, and a fifth utterance corresponding to the fourth phoneme.

19. The method of claim 18, further comprising retrieving, from the word-corpus, the first utterance, the second utterance, the third utterance, the fourth utterance, and the fifth utterance.

* * * * *